United States Patent [19]

Sakai et al.

[11] Patent Number: 4,554,674

[45] Date of Patent: Nov. 19, 1985

[54] APPARATUS FOR DETECTING THE AMOUNT OF MOVEMENT OF A MEMBER TO BE CONTROLLED

[75] Inventors: Shinji Sakai, Yokohama; Takashi Kawabata, Kamakura; Yoshihito Harada, Kawasaki, all of Japan

[73] Assignee: Canon Kabushiki Kaisha, Tokyo, Japan

[21] Appl. No.: 506,999

[22] Filed: Jun. 23, 1983

[30] Foreign Application Priority Data

Jul. 6, 1982 [JP] Japan .................................. 57-118232

[51] Int. Cl.$^4$ .......................... G03B 7/00; G01B 7/00
[52] U.S. Cl. ..................................... 377/17; 307/517; 354/400; 377/24
[58] Field of Search ............... 307/471, 518, 517, 236; 354/195.1, 400, 402, 485, 486; 250/201 PF, 204; 377/17, 24

[56] References Cited

U.S. PATENT DOCUMENTS

| | | | |
|---|---|---|---|
| 3,661,464 | 5/1972 | Hubbard | 377/17 |
| 4,086,581 | 4/1978 | Ito et al. | 354/486 |
| 4,089,011 | 5/1978 | Date et al. | 354/486 |
| 4,210,393 | 7/1980 | Ishiguro et al. | 354/486 |
| 4,486,891 | 12/1984 | Kimoto et al. | 377/24 |

Primary Examiner—John S. Heyman
Attorney, Agent, or Firm—Fitzpatrick, Cella, Harper & Scinto

[57] ABSTRACT

This specification discloses an apparatus for detecting and counting the pulse from a monitor signal source which repetitively forms a pulse in association with a member to be controlled and thereby detecting the amount of movement of the member to be controlled. In the apparatus, depending on whether the pulse put out from the monitor signal source for the first time starts from a rising signal or from a falling signal, the count mode of the pulse is made into a falling pulse count mode or a rising pulse count mode, thereby ensuring accurate detection of the amount of movement to be accomplished.

13 Claims, 10 Drawing Figures

APPARATUS FOR DETECTING THE AMOUNT OF MOVEMENT OF A MEMBER TO BE CONTROLLED

BACKGROUND OF THE INVENTION

1. Field of the Invention

This invention relates to a movement amount detecting apparatus for detecting the amount of movement of an object, and particularly to a movement amount detecting apparatus suitable for use in an automatic focus adjusting apparatus for controlling the amount of movement of a lens.

2. Description of the Prior Art

Heretofore, in this type of apparatus, as shown in FIG. 1 of the accompanying drawings, a focusing lens 1 has been designed to be capable of being driven by a motor 2 and a feed screw 3 and the lens has been moved and in response to the movement of the lens, a brush 4 has been scanned relative to a comb-tooth-like conductor pattern 5 to obtain a number of pulses (monitor signals) corresponding to the amount of movement of the lens and thereby detect the amount of movement of the lens and, when the number of pulses has reached a predetermined value, the movement of the lens has been stopped, whereby control of the amount of movement of the lens has been accomplished. However, when the pulse signals are counted, actually the rising or falling signal of the pulse signals has been detected to thereby accomplish counting of the pulses and even where it is desired to drive the lens by an amount corresponding to one pulse, the lens actually cannot be moved and this has been inconvenient.

For example, when the falling of the pulses is to be counted, if in the initial position the brush and the pattern are positioned as shown in FIG. 2A of the accompanying drawings, the falling signal is obtained when the brush 4 has been moved to a position indicated by dotted line and therefore, in such case, the brush can be driven by a distance $d_1$ in one-pulse drive, whereas when in the initial position the brush and the pattern are positioned as shown in FIG. 2B of the accompanying drawings, the falling signal is produced when the brush has been moved to a position indicated by dotted line and thus, in one-pulse drive, the lens is hardly moved and actually there occurs the inconvenience that the lens cannot be driven.

SUMMARY OF THE INVENTION

The present invention has been made in view of the above-noted point and provides an object movement amount detecting apparatus which comprises a brush and a conductor pattern or the like and which detects the movement of an object and detects a change in output condition of a monitor signal periodically varying the output condition and thereby detect the amount of movement of the object, and which detects the initial state of a monitor signal producing source forming the monitor signal, changes over the mode of judging the output condition of the monitor signal to a mode corresponding to the initial state, blocks the detecting operation for the first output condition change of the monitor signal, detects the second and subsequent output condition changes and thereby ensures a predetermined amount of movement of the object to be reliably accomplished even during one monitor signal drive.

Other objects and features of the present invention will become apparent from the following detailed description of an embodiment thereof taken in conjunction with the accompanying drawings.

DESCRIPTION OF THE PREFERRED EMBODIMENT

A movement amount detecting apparatus in accordance with the present invention will hereinafter be described.

Figure 3:
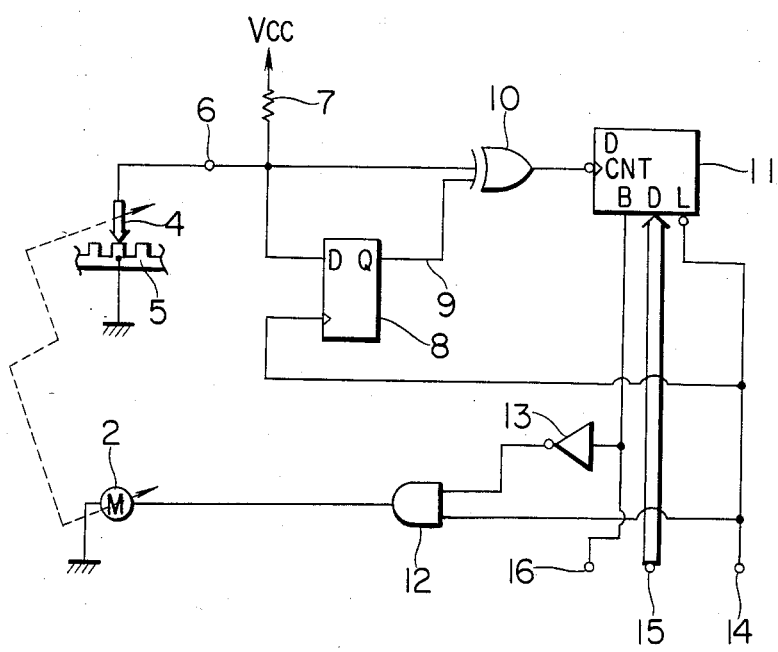
FIG. 3 is a circuit diagram showing an embodiment of a movement amount detecting apparatus according to the present invention.

FIG. 3 is a circuit diagram showing an embodiment of the movement amount detecting apparatus in accordance with the present invention, and a case where the apparatus of the present invention is applied to the focus adjusting device of a picture-taking lens is shown in this embodiment.

Figure 1:
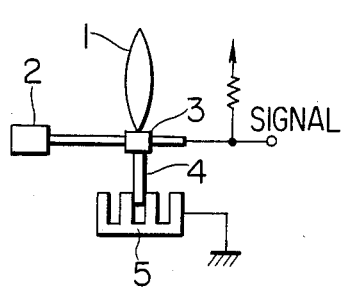
FIG. 1 shows the construction of an embodiment of an apparatus for detecting the amount of movement of a lens.
Figure 2A:
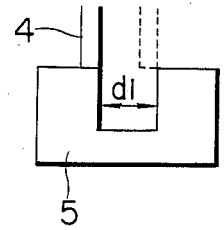
FIGS. 2A and 2B illustrate the operation of an apparatus according to the prior art.
Figure 2B:
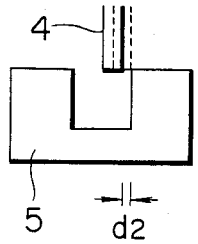

In FIG. 3, reference numeral 4 designates scanning means such as a brush which slidably scans a fixed conductor pattern 5 in accordance with movement of a lens as shown in FIG. 1. The brush and the pattern together form a monitor signal source. As the monitor signal source, instead of the combination of the brush and the pattern, a photointerrupter comprising a combination of a light-receiving element and a light-emitting element may be used to photoelectrically form a monitor signal, or a variation in magnetism may be detected by an electromagnetic system to form a monitor signal. Reference numeral 2 denotes a drive motor which drives a feed screw or the like to move a lens, as shown in FIG. 1. The brush 4 is connected to a resistor 7 through a terminal 6 and, when the brush 4 and the pattern 5 shift from contact to non-contact, a rising signal is delivered from the terminal 6 and, when the brush 4 and the pattern 5 shift from non-contact to contact, a falling signal is delivered from the terminal 6. The resistor and the monitor signal source together constitute a monitor signal forming circuit. Designated by 11 is a presettable down counter having a preset terminal D. The counter 11 counts the falling signal. The counter 11 has a borrow terminal B which delivers a high level signal (hereinafter referred to as the "1" signal) as a borrow signal when the content of the counter becomes zero, and a load terminal L for loading into the counter the numerical value input to the terminal D, and constitutes a motor control circuit.

Reference numeral 14 designates a drive signal input terminal, and reference numeral 12 denotes an AND gate having one input end connected to the terminal 14 and the other input end connected to the borrow terminal of the aforementioned counter through an inverter 13. The gate 12 and the inverter together constitute a drive circuit for the motor 2.

Designated by 8 is a D type flip-flop as memory means. The D terminal of the flip-flop 8 is connected to the aforementioned terminal 6 and the clock terminal of the flip-flop 8 is connected to the aforementioned terminal 14. As the memory means, a latch circuit may be used instead of the flip-flop. Denoted by 10 is an exclusive OR gate having one input end connected to the aforementioned terminal 6 and the other input end connected to the Q output of the flip-flop 8. The exclusive OR gate 10 and the flip-flop 8 together constitute a mode determining circuit for detecting the state of contact between the brush 4 and the pattern 5 and determining whether the count mode of the signal from the terminal 6 by the counter 11 is a rising signal count mode or a falling signal count mode.

The operation of the FIG. 3 embodiment will now be described.

Assume that a distance measuring circuit or the like, not shown, is operated in response to a release operation to detect the object distance and a digital value corresponding to the object distance has been transmitted to the preset terminal D of the counter 11 through a terminal 15.

Figure 4A:
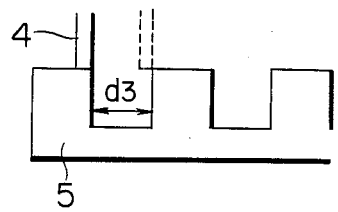
FIGS. 4A, 4B and 4C and FIGS. 5A, 5B and 5C illustrate the operation of the FIG. 3 embodiment.

In this state, a low level signal (hereinafter referred to as the "0" signal) is transmitted to the terminal L and the digital value of the terminal D is set in the counter 11. Thereafter, the "1" signal as a drive starting signal is input from a terminal 14 and in response to the "1" signal, the counter 11 holds the set digital value. Also, the "1" signal is input to the clock terminal of the flip-flop 8 and the state of contact between the brush 4 and the pattern 5 in the initial position is detected, and the result of the detection is stored in the flip-flop 8. Assuming that in the initial position, the brush 4 and the conductor pattern 5 are in contact with each other as shown in FIG. 4A, the terminal 6 is putting out the "0" signal. Consequently, the flip-flop 8 puts out the "0" signal from the Q output terminal thereof in response to the "1" signal from the terminal 14 and selects the falling count mode of the monitor signal.

Further, the "1" signal from the terminal 14 is applied to one input end of an AND gate 12 and the "1" signal from the inverter 13 is also applied to the other input end of the AND gate 12 and therefore, the AND gate 12 puts out the "1" signal in response to the "1" signal as the drive signal from the terminal 14, thus starting to drive the motor 2.

Figure 4B:
Figure 4C:

By the motor 2 being driven, the lens starts to move and, in response to the movement of the lens, the brush 4 slides on the pattern 5. Thereby, a monitor signal as shown in FIG. 4B is delivered from the terminal 6 and transmitted to one input of the exclusive OR gate 10. The Q output of the flip-flop 8 is the "0" signal as previously described and therefore, the output of the gate 10 is a monitor signal itself as shown in FIG. 4C and this signal is applied as input to a down counter which counts the falling signal, and the down count from the set value is effected and, when the content of the counter has become zero, the "1" signal as the borrow signal is put out from a terminal B. This "1" signal is transmitted as the "0" signal to the AND gate 12 through the inverter 13 and therefore, the driving of the motor 2 is stopped, the lens positioning operation is terminated and the adjustment of the amount of movement of the lens based on the measured distance value is terminated.

Description will now be made of a case where a digital value corresponding to 1 is set in the counter 11 in the above-described operation of adjusting the amount of movement of the lens.

In this case, when the brush 4 is moved to a position indicated by dotted line in FIG. 4A, the falling signal is input to the counter 11 as shown in FIG. 4C and thus, the lens is moved by a distance $d_3$ corresponding to one monitor signal.

Figure 5A:
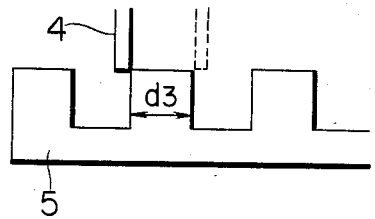

Description will now be made of a case where in the initial position, the brush 4 and the pattern 5 are in non-contact state as shown in FIG. 5A.

Figure 5B:
Figure 5C:
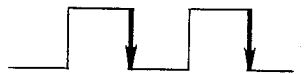

In this case, the "1" signal is put out from the terminal 6 in the initial state and therefore, in response to the "1" signal from the terminal 14, the Q terminal of the flip-flop 8 delivers the "1" signal and makes the mode of the counter for the monitor signal into the rising signal count mode. Thereafter, in the manner as previously described, the motor 2 starts driving by the "1" signal from the AND gate 12 and, when movement of the lens is effected, a monitor signal as shown in FIG. 5B is delivered from the terminal 6. The Q output of the flip-flop 8 is "1" as described above and therefore, as shown in FIG. 5C, the exclusive OR gate 10 transmits the inverted signal of the monitor signal to the counter 11. Since the counter 11 is a counter for counting the falling signal, this counter 11 substantially counts the rising signal of the monitor signal and, when the count value has become the preset value, the driving of the motor is stopped in the manner as described above and the operation of adjusting the amount of movement of the lens is terminated.

A case where a corresponding digital value corresponding to 1 is set in the counter 11 as in the above-described case will now be considered. In this case, when the brush 4 has been moved to a position indicated by dotted line in FIG. 5A, the monitor signal becomes a rising signal for the first time and a falling signal is applied as input to the counter 11. Consequently, again in this case, the lens is moved by the distance $d_3$. In the above-described embodiment, the counter is shown as one for counting the falling signal, but where a counter for counting the rising signal is employed, an exclusive NOR gate can be provided instead of the exclusive OR gate.

Also, as the mode determining circuit, instead of the exclusive OR gate, a first signal line for connecting the terminal 6 to the counter 11 through an inverter and a second signal line for connecting the terminal 6 directly to the counter may be provided so that the first or second signal line is selected by a switch circuit in accordance with the Q output of the flip-flop 8. As another example of the mode determining circuit, the counter itself may be provided with the rising count mode and the falling count mode and the terminal 6 may be connected directly to the counter so that the count mode of the counter is selected in accordance with the Q output of the flip-flop 8.

Further, in the embodiment illustrated, detection of the amount of movement is accomplished by counting the monitor signal, but the detecting apparatus of the present invention is also applicable where a code signal such as a gray or binary code is formed in conformity with movement of the object and the code signal is used as the monitor signal.

In the present embodiment, a focus adjusting apparatus is shown as an example, but the present invention is applicable, for example, to an aperture control mechanism or the like. In such case, of course, a digital value corresponding to the aperture value signal from an aperture operating circuit may be set in the counter 11, an aperture adjusting mechanism may be driven by a motor and the brush 4 may be operatively associated therewith.

Also, in the embodiment illustrated, a motor is shown as the drive source, but instead of the motor, a spring member may be provided and the restraint of the spring member may be released by electromagnetic means energized by the output of the AND gate 12 to drive the lens and the electromagnetic means may be deenergized when the output of the AND gate 12 is extinguished, so that driving of the lens may be stopped by a restraining member.

Further, the count mode for the monitor signal of the counter can also be determined in accordance with the initial state of the monitor signal forming circuit even if a differentiation circuit is connected to the terminal 6 and flip-flops adapted to be set by the polarity (positive or negative pulse) of a differentiation pulse put out at first when the lens is driven are provided so that when the flip-flop adapted to be set by the negative pulse is set at first, the output of the terminal 6 is inverted by an inverter and it is counted by the counter and when the flip-flop adapted to be set by the positive pulse is set at first, the output of the terminal 6 is counted directly by the counter.

Also, in the embodiment illustrated, the single counter 11 is provided and the driving of the motor is stopped by the borrow output, but another setting counter for setting a digital value corresponding to the amount to be controlled such as the distance measurement signal from the distance measuring circuit may be provided and a magnitude comparator for comparing the contents of the setting counter and the counter 11 may further be provided so that when the contents of the two counters have become coincident with each other, an output "1" is put out from the comparator and this output "1" is transmitted to the inverter 13 to stop the driving of the motor.

Also, an information source such as a digital switch may be directly connected to the terminal 15 and any drive information may be manually set as a digital value. Further, as the means for forming the "1" signal input from the terminal 14, various known methods may be adopted such as providing a switch adapted to shift from its OFF position to its ON position in response, for example, to the release operation (second stroke operation or the like) of the camera so that when the switch is in its OFF position, "0" signal is formed by the switch and when the switch is in its ON position, "1" signal is formed by the switch.

In the present invention, as described above, the count mode of the counter for the monitor signal may be changed over to the falling or the rising signal count mode in accordance with the initial state of the monitor signal forming circuit and the count for the second and subsequent signal changes except the first signal change of the monitor signal is permitted and therefore, even during one monitor signal driving, the object to be controlled such as the lens can be reliably driven by a predetermined amount and thus, the disadvantages peculiar to the apparatus of the prior art can be eliminated.

In the embodiment illustrated, when the brush and the pattern are in contact with each other in the initial state, the count synchronized with the falling pulse is effected and when the brush and the pattern are in non-contact in the initial state, the count synchronized with the rising pulse is effected, but alternatively, design may be made such that when the brush and the pattern are in contact with each other in the initial state, the rising pulse is counted and when the brush and the pattern in non-contact, the falling pulse is counted. In such case, instead of the pattern being connected to the ground, a predetermined voltage Vcc can be applied to the pattern and the brush can be connected to the ground through the resistor 7.

What we claim is:

1. A movement amount detecting apparatus having a monitor signal source for forming a pulse signal in association with movement of an associated member to be controlled, said apparatus being for detecting the pulse signal from said monitor signal source and thereby detecting the amount of movement of said associated member to be controlled, said apparatus including:
   (a) discriminating means for discriminating the initial state of said monitor signal source;
   (b) a detecting circuit for detecting said pulse signal and obtaining information corresponding to the amount of movement of said associated member to be controlled; and
   (c) a mode determining circuit for determining, on the basis of the result of the discrimination of said discriminating means, the pulse signal detecting operation for said pulse signal to any one of a rising pulse detecting mode and a falling pulse detecting mode.

2. A movement amount detecting apparatus having a monitor signal source for repetitively forming a pulse signal in association with movement of an associated member to be controlled, said apparatus being for detecting the pulse signal from said monitor signal source and thereby detecting the amount of movement of said associated member to be controlled, said apparatus including:
   (a) discriminating means for discriminating whether the pulse formed at first from said monitor signal source is a pulse starting from a rising signal or a pulse starting from a falling signal;
   (b) a detecting circuit for detecting said pulse signal and obtaining information corresponding to the amount of movement of said associated member to be controlled; and
   (c) a determining circuit for determining, on the basis of the result of the discrimination of said discriminating means, the detecting mode for the pulse signal of said detecting circuit to any one of a rising signal detecting mode and a falling signal detecting mode, said determining circuit determining the detecting mode so that different detecting modes are assumed when it is discriminated by said discriminating means that a pulse starting from a rising signal is formed at first from said monitor signal source and when it is discriminated by said discriminating means that a pulse starting from a falling signal is formed from said monitor signal source.

3. A movement amount detecting apparatus including:
   (a) monitor signal source comprising a first member and a second member, said first member and said second member being scanned relative to each other by movement of an associated member to be controlled, and by said scanning, said second member alternatively exhibiting a first state and a second state relative to said first member, further by the shift from said first state to said second state, the output condition being shifted from a first electrical condition to a second electrical condition and by the shift from said second state to said first state, the output condition being shifted from said second electrical condition to said first electrical condition, whereby said monitor signal source repetitively forms a pulse signal in association with the movement of said associated member to be controlled;

(b) discriminating means for discriminating the initial state of said monitor signal source;

(c) a detecting circuit for detecting said pulse signal and thereby obtaining information corresponding to the amount of movement of said associated member to be controlled; and (d) a mode determining circuit for determining, on the basis of the result of the discrimination of said discriminating means, whether the detecting operation of said detecting circuit for said pulse signal should be effected in a first detecting mode wherein a detection synchronized with the shift from said first electrical condition to said second electrical condition is effected or in a second detecting mode wherein a detection synchronized with the shift from said second electrical condition to said first electrical condition is effected, said mode determining circuit selecting different detecting modes when it is detected by said discriminating means that said first and second members are in the initial state and in said first state and when it is detected by said discriminating means that said first and second members are in the initial state and in said second state.

4. A movement amount detecting apparatus according to claim 1 or 2, wherein said mode determining circuit has the inverting function of inverting the pulse from said monitor signal source and determines, on the basis of the result of the discrimination of said descriminating means, whether the pulse signal inverted by said inverting function should be transmitted to said detecting circuit.

5. A movement amount detecting apparatus according to claim 1 or 2, wherein said detecting circuit is formed by a counter having a rising pulse mode and a falling pulse mode, and the rising or the falling pulse mode is determined by said mode determining circuit.

6. A movement amount detecting apparatus according to claim 1, 2 or 3, wherein said associated member to be controlled is the driving member of a picture-taking lens and said monitor signal source forms a pulse signal in response to movement of the picture-taking lens.

7. A movement amount detecting apparatus including:

(a) a monitor signal source comprising a first member and a second member, said first member and said second member being scanned relative to each other by movement of an associated member to be controlled, and by said scanning, said second member alternately exhibiting a first state and a second state relative to said first member, further by the shift from said first state to said second state, the output condition being shifted from a first electrical condition to a second electrical condition and by the shift from said second state to said first state, the output condition being shifted from said second electrical condition to said first electrical condition, whereby said monitor signal source repetitively forms a pulse signal in association with the movement of said associated member to be controlled;

(b) a circuit having the inverting function of inverting the pulse of said monitor signal source;

(c) discriminating means for detecting whether the initial state of said monitor signal source is in a first state or in a second state;

(d) a detecting circuit for detecting said pulse signal and thereby obtaining information corresponding to the amount of movement of said associated member to be controlled; and (e) a determining circuit for determining, on the basis of the result of the discrimination of said discriminating means, whether said detecting circuit should be caused to effect detection of a pulse signal synchronized with the pulse signal inverted by the inverting function of said circuit or to effect detection of a pulse signal synchronized with a non-converted pulse signal, said determining circuit selecting different pulse signal detecting modes when it is detected by said discriminating means that said first and second members are in the initial state and in said first state and when it is detected by said discriminating means that said first and second members are in the initial state and in said second state.

8. A movement amount detection apparatus with a movement monitor signal generating means for generating pulse signals in response to the movement of a member of which movement amount is detected, in which the generated pulse signals are detected and the movement amount thereof is detected on the basis of the detected result, said apparatus comprising:

(a) discriminating means for discriminating a signal generated from the movement monitor signal generating means before the movement of the member;

(b) a mode determining circuit for determining, on the basis of the result of the determination of said discriminating means, as to whether the movement amount detection is executed on the basis of the rising of the generated pulse signals from said monitor signal generating means or the falling of the generated pulse signals; and (c) a detecting circuit for detecting said pulse signals generated from said movement monitor signal generating means according to the movement of the monitor signal generating means according to the movement of the member to obtain the movement amount information corresponding to the amount of movement of said member on the basis of the determination of said mode determining circuit.

9. An apparatus according to claim 8, wherein said movement monitor signal generating means comprises a conductive pattern and a contact member, and said contact means is moved on said conductive pattern in response to the movement of said member to generate said pulse signals.

10. An apparatus according to claim 9, wherein said signal discriminated by said discriminating means relates to the positional relationship between said conductive pattern and said contact means.

11. A movement amount detection apparatus having a movement monitor signal generating means for generating a movement monitor signals indicating a first state of said monitor signal generating means and a second state thereof in turn in response to a movable member to detect the amount of movement of said movable member, said apparatus comprising:

(a) a discriminating circuit for discriminating the states of said monitor signal generating means in the initial state of said movable member;

(b) a detection mode determining circuit for determining, on the basis of the discrimination of said discriminating circuit, as to whether the detection operation of said apparatus is performed under the detection mode according to change from the first state to the second state, or the detection mode according to change from the second state to the first state; and (c) detecting means for detecting the amount of the movement of said movable member on the basis of the discrimination of said discriminating circuit and the determination of said determining circuit.

12. A movement amount detection apparatus according to claim 11, wherein said movement monitor signal generating means comprises a conductive pattern and a contact member, and said contact means is moved on said conductive pattern in response to the movement of said movable member to generate said movement monitor signals.

13. A movement amount detection apparatus according to claim 12, wherein said first state indicates the contact condition of said conductive pattern and said contact member, and said second state indicates the non-contact condition of said conductive pattern and said contact member.ing a pulse s

* * * * *

UNITED STATES PATENT AND TRADEMARK OFFICE
CERTIFICATE OF CORRECTION

PATENT NO. : 4,554,674
DATED : November 19, 1985
INVENTOR(S) : SHINJI SAKAI, ET AL.

It is certified that error appears in the above-identified patent and that said Letters Patent is hereby corrected as shown below:

Column 10, line 11, Claim 13, delete "ing a pulse s"

Signed and Sealed this

Fifteenth Day of July 1986

[SEAL]

Attest:

DONALD J. QUIGG

Attesting Officer

Commissioner of Patents and Trademarks